United States Patent
Samejima et al.

(10) Patent No.: US 6,877,302 B2
(45) Date of Patent: Apr. 12, 2005

(54) MID-MOUNT MOWER

(75) Inventors: Kazuo Samejima, Sakai (JP); Kenichi Chujo, Sakai (JP); Teruo Shimamura, Sakai (JP); Yoshiyuki Esaki, Sakai (JP); Masatoshi Yamaguchi, Sakai (JP); Yoshihiro Kawahara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/378,266

(22) Filed: Mar. 3, 2003

(65) Prior Publication Data

US 2004/0006959 A1 Jan. 15, 2004

(30) Foreign Application Priority Data

Jul. 10, 2002 (JP) ........................................ 2002-201751

(51) Int. Cl.$^7$ ............................................. A01D 67/00
(52) U.S. Cl. ............................... 56/320.2; 56/DIG. 22; 56/6
(58) Field of Search .............................. 56/320.1, 15.2, 56/17.1, 6, DIG. 22

(56) References Cited

U.S. PATENT DOCUMENTS

| | | | | | |
|---|---|---|---|---|---|
| 4,621,699 | A | * | 11/1986 | Slazas | ........................ 180/53.7 |
| 6,185,920 | B1 | | 2/2001 | Oxley | |
| 6,189,305 | B1 | | 2/2001 | Wright et al. | |
| 6,205,754 | B1 | | 3/2001 | Laskowski | |
| 6,237,957 | B1 | * | 5/2001 | Takekata et al. | ............ 280/781 |
| 6,301,865 | B1 | | 10/2001 | Velke et al. | |
| 6,530,200 | B1 | | 3/2003 | Minoura et al. | |

FOREIGN PATENT DOCUMENTS

| JP | 2000-351330 | 12/2000 |
|---|---|---|
| JP | 2002-67721 | 3/2002 |

* cited by examiner

Primary Examiner—Meredith Petravick
(74) Attorney, Agent, or Firm—Webb Ziesenheim Logsdon Orkin & Hanson, P.C.

(57) ABSTRACT

A mid-mount mower including a body frame supported above the ground by front wheels and rear wheels, and a mower unit vertically movably suspended from the body frame between the front wheels and rear wheels. The mower unit includes a mower deck having a top board, and a front wall, side walls and a rear wall depending from the top board. The mower deck has a rearwardly opening recess formed in a sideways middle region at a rear end thereof. A mower input shaft is disposed on the top board for transmitting power to the rotary blades juxtaposed inside the mower deck to be rotatable about three vertical axes arranged sideways. The mower input shaft extends longitudinally of the body frame and has a rear connecting end. A PTO shaft is provided in a rear transmission mechanism that drives the rear wheels. The PTO shaft extends longitudinally of the body frame and has a forward connecting end. A relay transmission shaft has one end thereof connected to the connecting end of the mower input shaft through a front universal joint, and the other end connected to the PTO shaft through a rear universal joint. The recess is recessed longitudinally of the body frame to an extent forwardly of the rear universal joint to receive the rear universal joint when the mower unit is raised.

13 Claims, 16 Drawing Sheets

MID-MOUNT MOWER

BACKGROUND OF THE INVENTION

1. Field of the Invention

This invention relates to a mid-mount mower having a mower unit vertically movably suspended from a body frame between front wheels and rear wheels. This mower unit has rotary blades rotatable about three vertical axes arranged sideways inside a mower deck, and a mower input shaft disposed on the mower deck to transfer power to the rotary blades. The mower input shaft extends longitudinally of the body frame, and a rear connecting end. The mower input shaft is connected through a universal joint by a relay transmission shaft to a PTO shaft provided in a rear transmission mechanism for driving the rear wheels.

2. Description of the Related Art

In a mower unit attachable to a lawn mower having the above construction, as disclosed in Japanese Patent Publication (Unexamined) No. 2002-67721, for example, the top board of the mower deck has a front portion arched to define a tunnel therein. Grass clippings flying from the front half of the rotating track of each rotary blade are transported along the tunnel to a grass discharge opening formed at one end of the mower deck. Such a mower unit is in wide use.

The mower deck with the grass-transmitting tunnel formed in the front portion thereof has a low rear portion. A blade-driving input shaft disposed on the mower deck is also low. Thus, even if the PTO shaft is disposed in a low rearward position of the vehicle body, the mower deck raised to a large extent never interferes with the universal joint.

The mower unit having the mower deck with the tunnel is suited for an operating mode for transporting grass clippings along the tunnel and discharging the clippings from one end of the deck (side discharge). However, the deck except the tunnel portion is insufficient in depth for a mulching operation for cutting the grass clippings into still smaller pieces and depositing them on the ground. It is difficult to cut the grass clippings into small pieces efficiently by retaining the grass clippings as entrained by rotation of the rotary blades for a sufficiently long time in mulching chambers (enclosures) formed in the mower deck. Thus, it has been proposed to enable a selection of a grass cutting operation in the side discharge mode or a mulching operation by using a flat mower deck having an increased and uniform overall depth.

However, with a flat deck structure in which the entire upper surface of the mower deck has a uniform height over the ground to increase the depth of its internal space, the blade-driving mower input shaft disposed on the mower deck has an increased height. Where this mower input shaft and the PTO shaft in the rearward position of the body frame are operatively interconnected through a universal joint and a transmission shaft as in the prior art, the rear end of the mower deck tends to interfere with the shaft transmission portion when the mower unit is raised. It is difficult to secure a sufficient height for raising the mower unit. Naturally, where the PTO shaft is installed in a high location, the mower unit may be raised high without the above interference. To install the PTO shaft in a high location, the rear transmission mechanism must also be disposed in a high location. This results in a different inconvenience that the center of gravity of the vehicle body is raised.

SUMMARY OF THE INVENTION

This invention has been made having regard to the state of the art noted above, its object is to provide a mid-mount mower for allowing a mower unit to be raised to a large extent without interference between a mower deck and a relay transmission shaft structure connecting a mower input shaft and a PTO shaft, while having a vehicle body of excellent stability with a low center of gravity due to the PTO shaft disposed in a low location.

The above object is fulfilled, according to this invention, by a mid-mount mower comprising:

a body frame supported above the ground by front wheels and rear wheels;

a mower unit vertically movably suspended from the body frame between the front wheels and the rear wheels, the mower unit including:

a mower deck having a top board, and a front wall, side walls and a rear wall depending from the top board, the mower deck having a rearwardly opening recess formed in a sideways middle region at a rear end thereof;

rotary blades juxtaposed inside the mower deck to be rotatable about three vertical axes arranged sideways; and a mower input shaft disposed on the top board for transmitting power to the rotary blades, the mower input shaft extending longitudinally of the body frame and having a rear connecting end;

a rear transmission mechanism for driving the rear wheels;

a PTO shaft provided in the rear transmission mechanism, the PTO shaft extending longitudinally of the body frame and having a forward connecting end; and a relay transmission shaft having one end thereof connected to the connecting end of the mower input shaft through a front universal joint, and the other end connected to the PTO shaft through a rear universal joint;

the recess being recessed longitudinally of the body frame to an extent forwardly of the rear universal joint to receive the rear universal joint when the mower unit is raised.

As the mower deck moves upward, the PTO shaft lowers relative to the mower deck. As a result, the relay transmission shaft and rear universal joint approach the upper surface of the mower deck. However, with the mid-mount mower according to this invention, the recess formed in the rear region of the mower deck is recessed deep to the extent forwardly of the rear universal joint. The rear universal joint is movable into the recess to avoid interference with the mower deck.

Thus, the mower unit may be raised to a large extent without interference between the mower deck and the relay transmission shaft structure connecting the mower input shaft and PTO shaft, while having the vehicle body of excellent stability with a low center of gravity due to the PTO shaft disposed in a low location.

In a preferred embodiment of this invention, the body frame includes a front frame pair extending substantially horizontally, and a rear frame pair extending rearward and downward from the front frame pair, the rear transmission mechanism being supported by the rear frame pair, the recess having an opening width larger than a width of the rear frame pair.

With these features, even where the right and left rear frames extend to a large extent downward in order to lower the rear transmission mechanism for driving the rear wheels, the mower unit may be raised to a large extent without interference between the mower deck and the rear frame pair. As a result, the lawn mower has excellent stability with a low center of gravity due to the rear transmission mechanism disposed in a low location.

To provide a lawn mower of excellent stability with a low center of gravity of the vehicle body, this invention proposes also to place the PTO shaft at a lower level than axles of the rear wheels.

Other features and advantages of this invention will be apparent from the following description of the embodiment to be taken with reference to the drawings.

DESCRIPTION OF THE PREFERRED EMBODIMENTS

Figure 1:
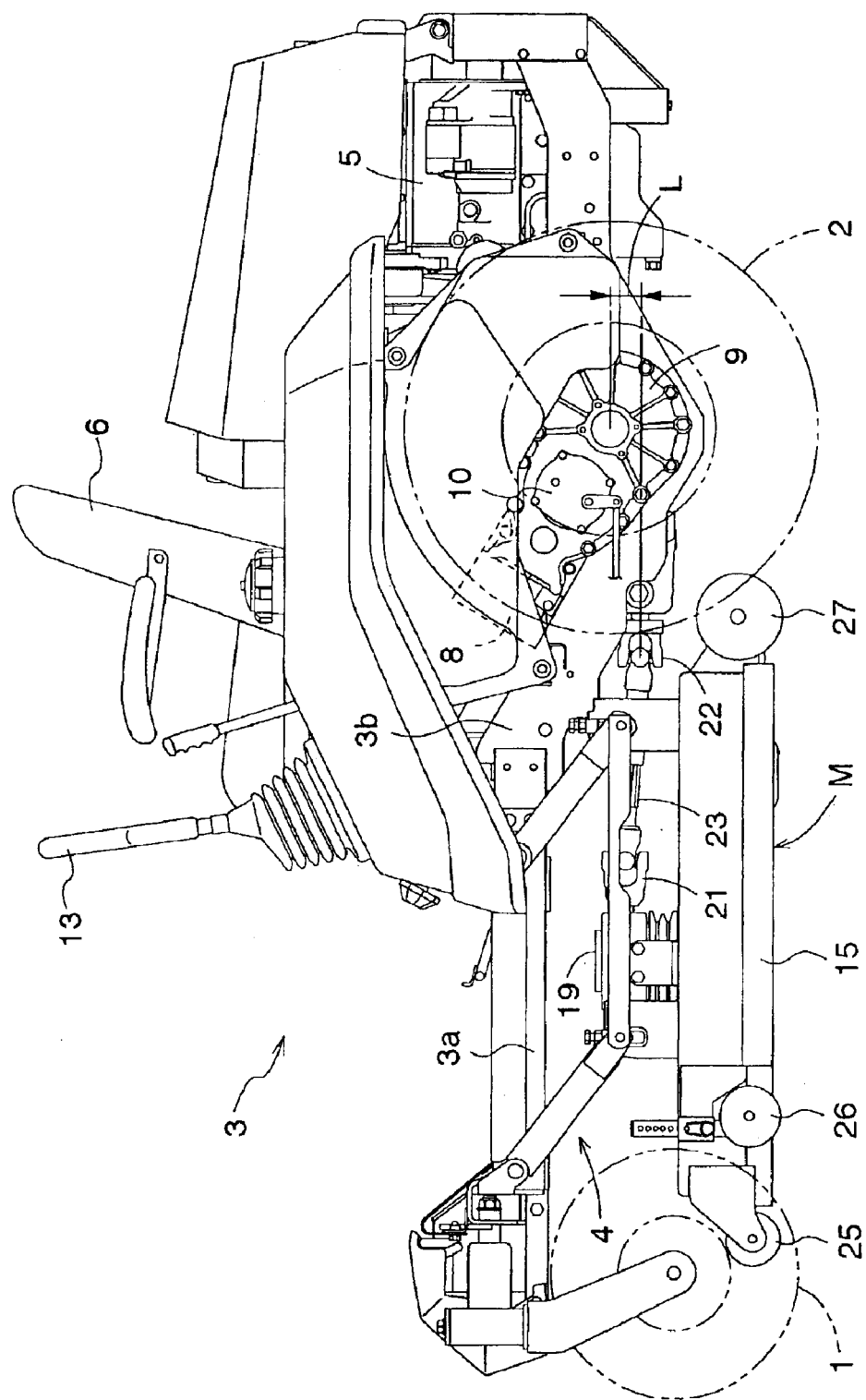
FIG. 1 is a side elevation of a mid-mount mower according to this invention.
Figure 2:
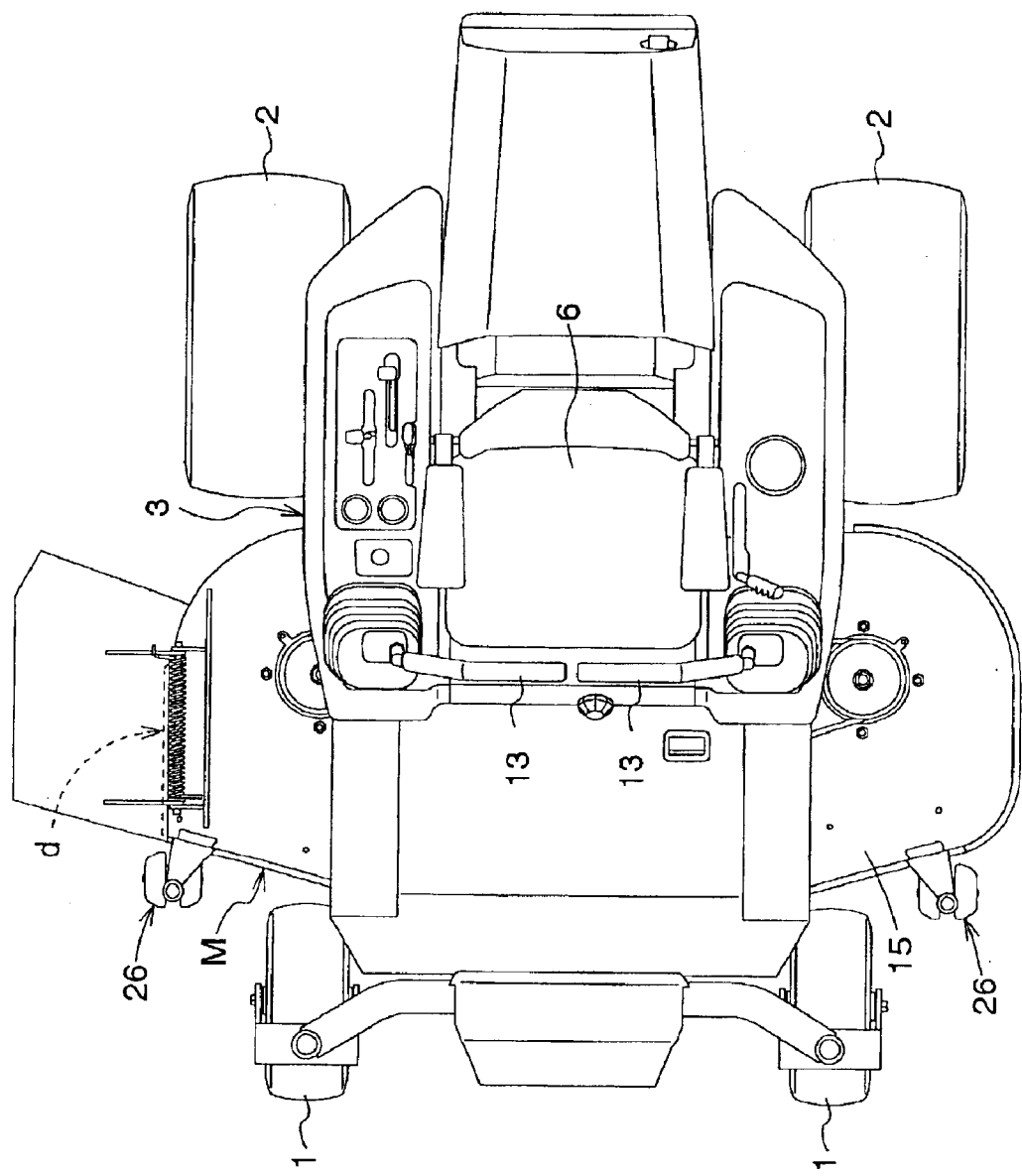
FIG. 2 is a plan view of the mid-mount mower shown in FIG. 1.

FIG. 1 shows a side elevation of a riding lawn mower which is one example of mid-mount mower according to this invention. FIG. 2 shows a plan view of the mower. This lawn mower includes a pair of right and left front wheels 1 in the form of casters, a pair of right and left drive rear wheels 2, and a vehicle body 3 supported by these wheels. A mower unit M is suspended from the vehicle body 3 between the front and rear wheels by a four-point link mechanism 4. The mower unit M may be moved up and down substantially parallel by vertically moving the link mechanism 4 with hydraulic pressure or manually. An engine 5 is mounted in a rearward position of the vehicle body 3, and a driver's seat 6 disposed forwardly of the engine 5.

Figure 3:
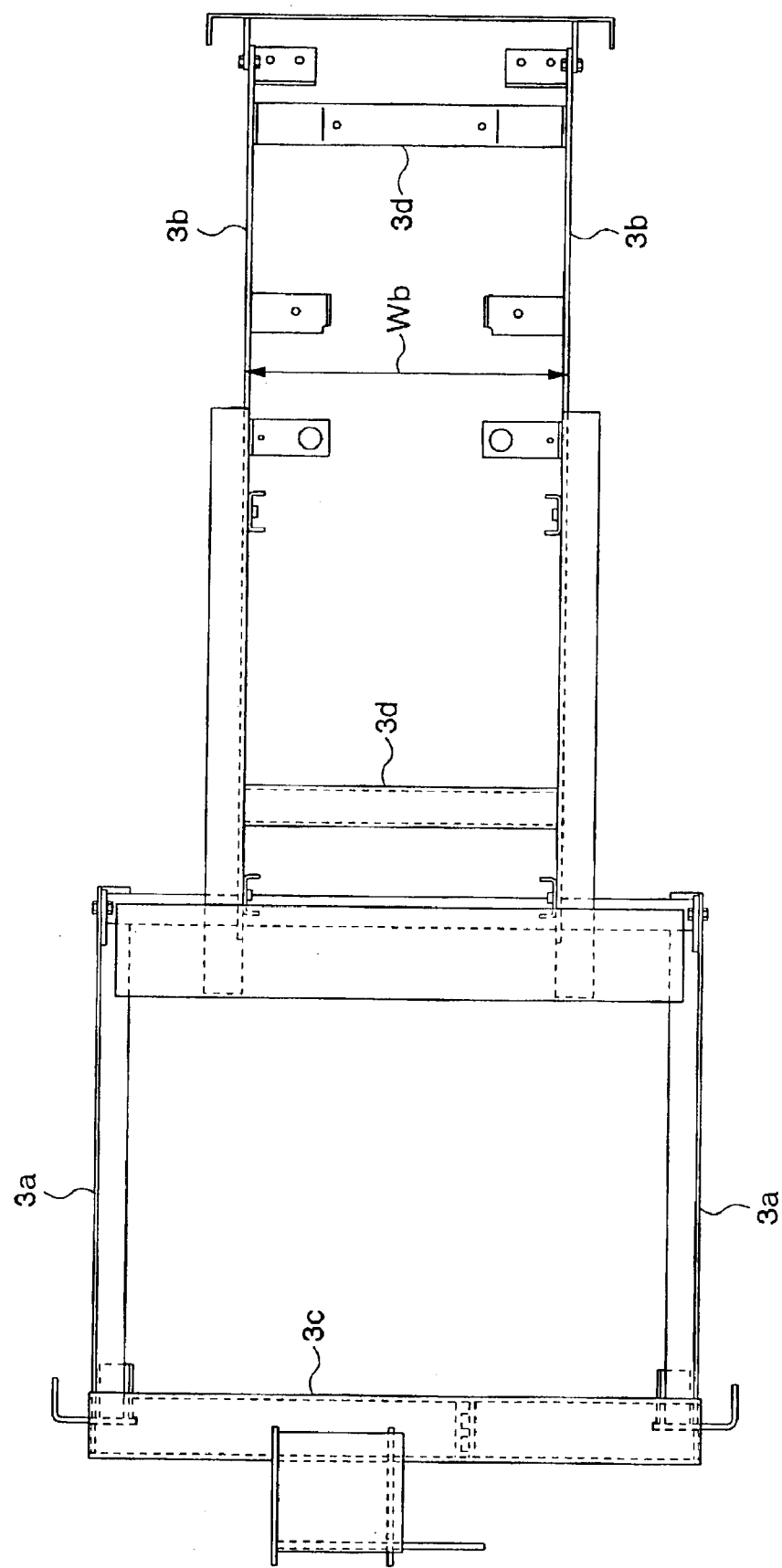
FIG. 3 is a plan view of a body frame.
Figure 4:
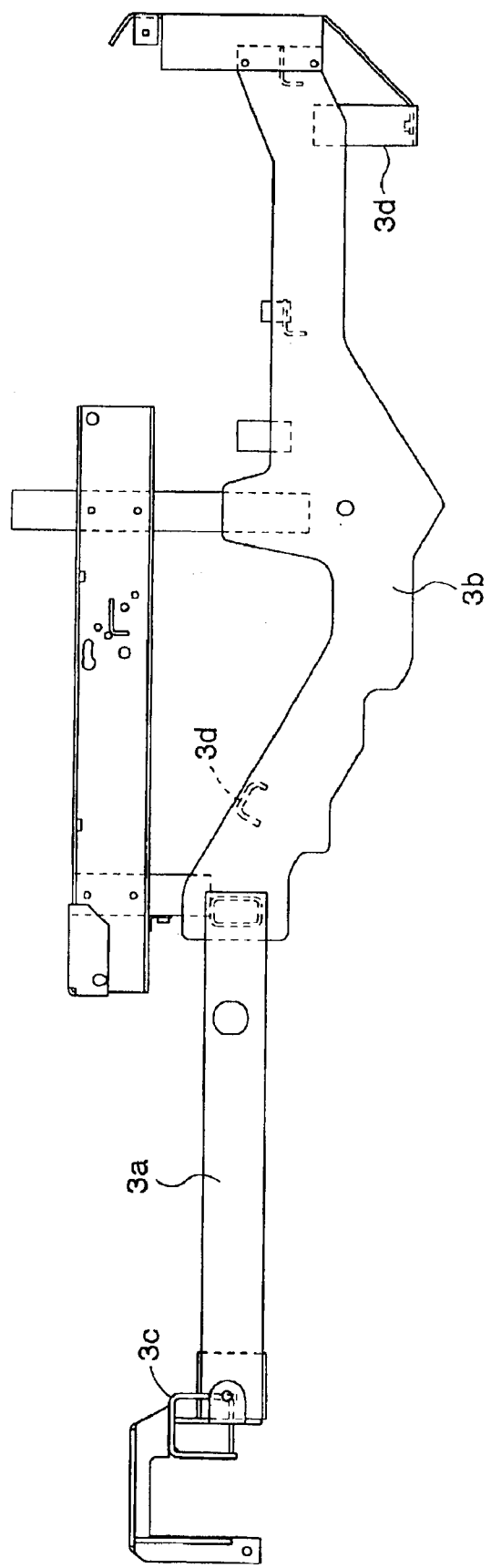
FIG. 4 is a side view of the body frame.
Figure 5:
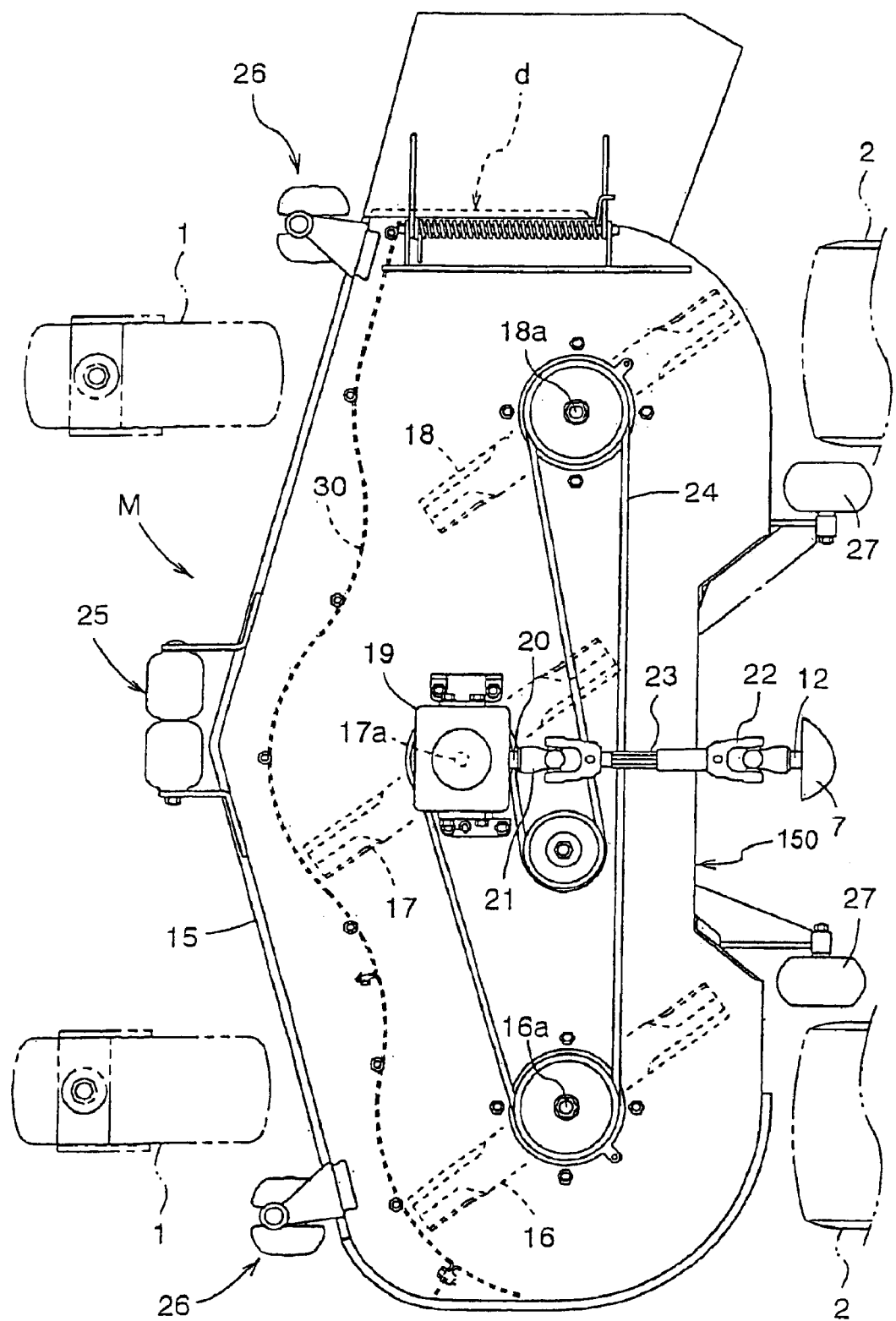
FIG. 5 is a plan view of a mower unit.

As shown in FIGS. 3 and 4, the vehicle body 3 includes a pair of right and left front frames 3a (hereinafter called front frame pair) interconnected by a front cross bar 3c with a large spacing therebetween, and a rear frame pair 3b extending rearward and downward from the rear end of the front frame pair 3a and extending horizontally from a halfway position. The rear frame pair 3b is connected by cross bars 3d with a smaller spacing therebetween than the front frame pair 3a. As shown in FIG. 5 also, the rear frame pair 3b has a width Wb between the portions thereof extending rearward and downward.

Figure 6:
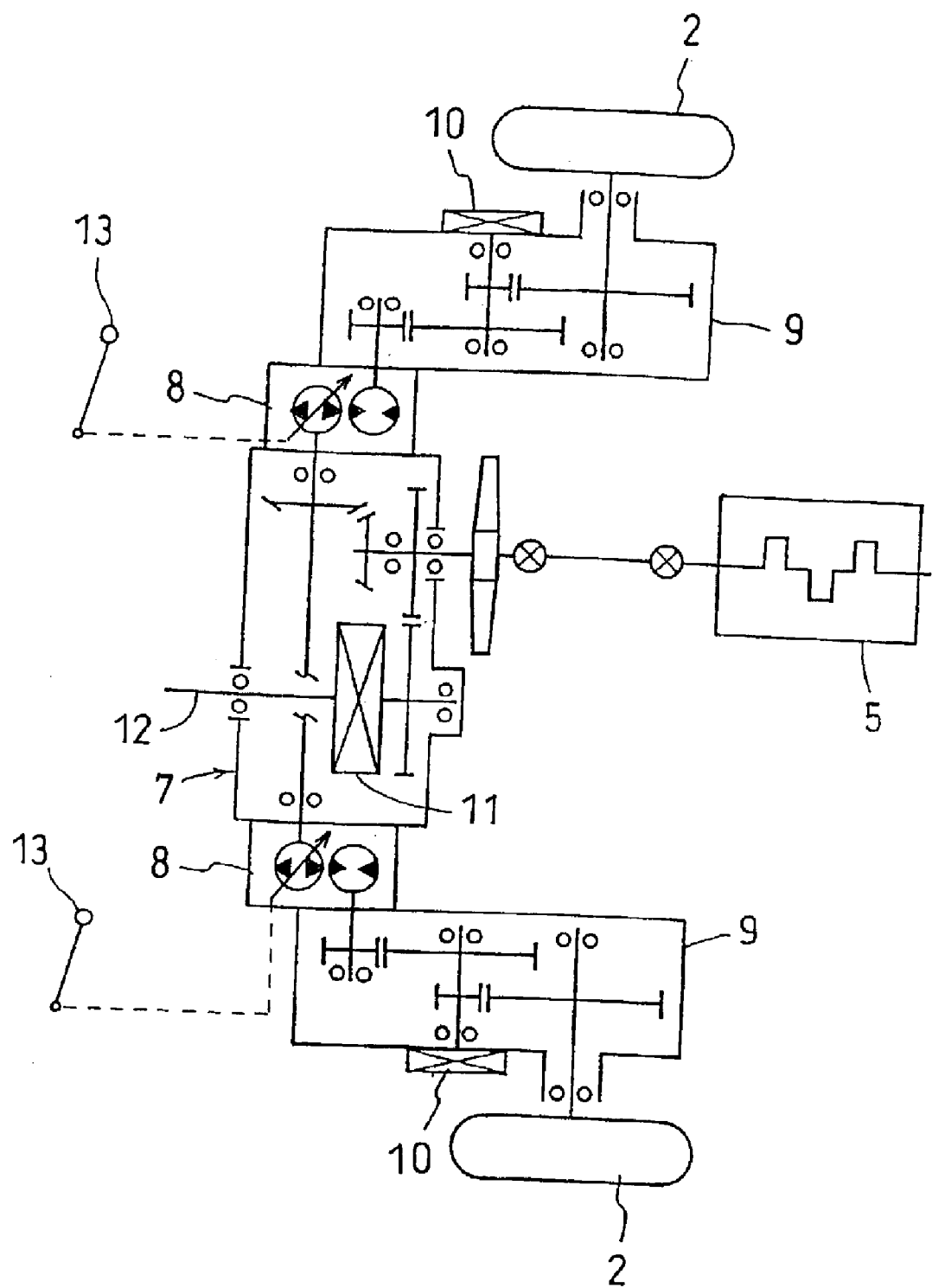
FIG. 6 is a schematic view of a power transmission system.
Figure 7:
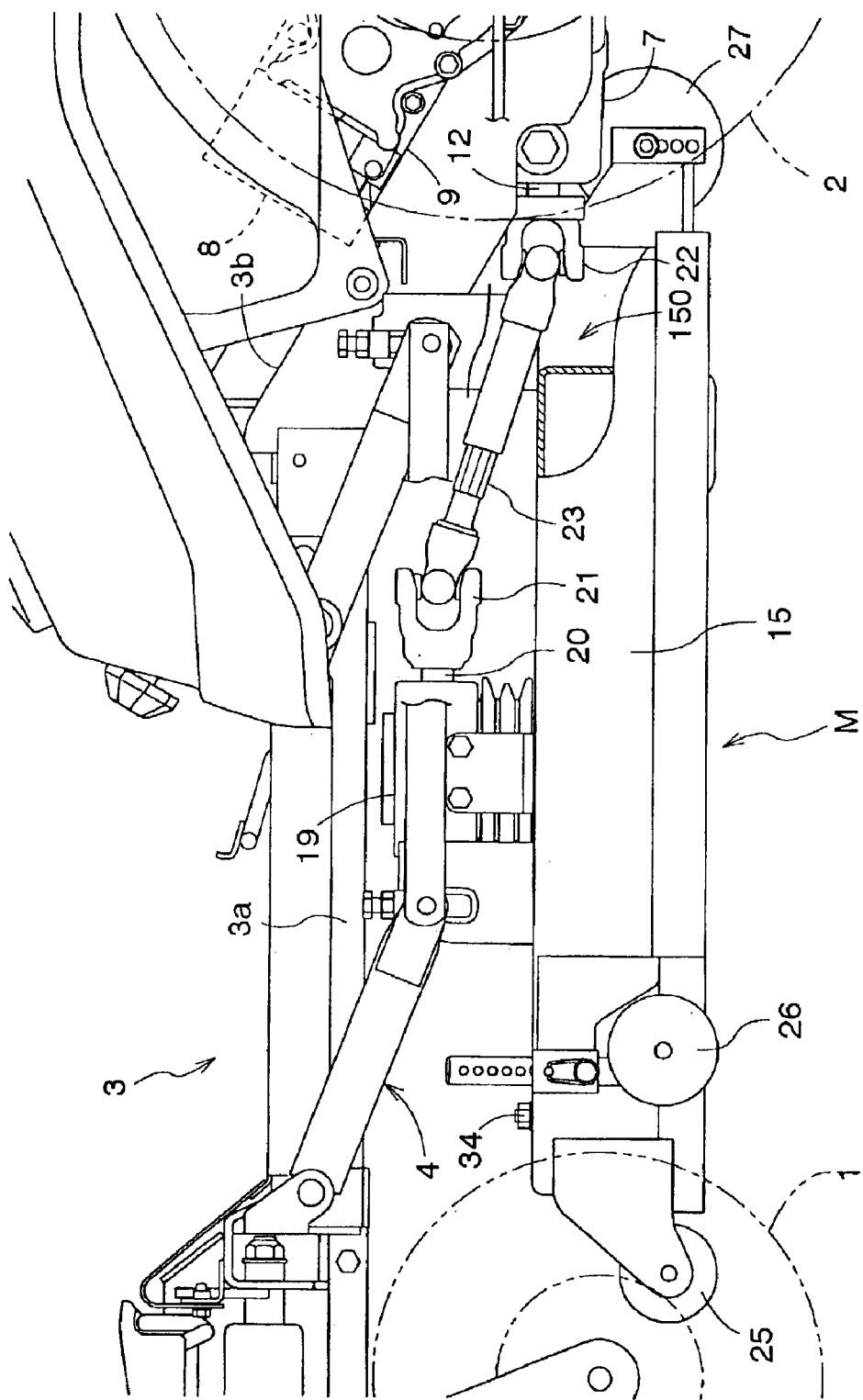
FIG. 7 is a side view, partly in section, of the mower unit in a raised position.

A rear transmission mechanism is supported centrally of the rear frame pair 3b. The transmission mechanism is schematically shown in FIG. 6. Output of the engine 5 is inputted to a counter case 7 to be divided to a propelling line and a working line. The power for the propelling line is converted into sideways rotary power, and inputted to a pair of right and left hydrostatic stepless transmissions (HSTs) 8. Power output in variable speed of each transmission 8 is transmitted to one of the rear wheels 2 through a reduction case 9. Each reduction case 9 includes a brake 10 for acting on the right or left rear wheel 2. The power for the working line is transmitted through a PTO clutch 11 and outputted forward from a PTO shaft 12.

The right and left stepless transmissions 8 are shiftable by propelling levers 13 arranged at opposite sides of the driver's seat 6 to be rockable fore and aft, respectively. Thus, the right and left rear wheels 2 are driven forward and backward in varied speeds independently of each other. When the right and left propelling levers 13 are rocked by the same amount forward, the right and left rear wheels 2 are driven at the same speed forward to move the vehicle body 3 straight forward. When the right and left propelling levers 13 are rocked by the same amount backward, the vehicle body 3 moves straight backward. When the right and left propelling levers 13 are rocked by different amounts, the right and left rear wheels 2 are driven at different speeds to turn the vehicle body 3 in a selected direction. Particularly when one of the propelling levers 13 is placed in a neutral stop position and the other propelling lever 13 is rocked to a forward or backward drive range, the vehicle body 3 makes a pivot turn about the rear wheel 2 standing still. When the propelling levers 13 are rocked in opposite directions from the neutral position, the right and left rear wheels 2 are driven in opposite directions to cause the vehicle body 3 to make a spin turn about a midpoint between the right and left rear wheels 2.

As shown in FIGS. 5 and 6, the mower unit M has a mower deck 15 opening downward and containing three rotary blades 16, 17 and 18 rotatable about vertical axes. The rotary blades 16, 17 and 18 are in a triangular arrangement in plan view, with the middle rotary blade 17 offset slightly forward. The mower deck 15 is a flat deck having a level upper surface, and an interior space having the same height from front to rear. The mower deck 15 has a grass discharge opening d formed at the right-hand end thereof.

The working power taken from the PTO shaft 12 is transmitted to an input shaft 20 extending rearward from a bevel gear case 19 disposed centrally of an upper surface of the mower deck 15, through front and rear universal joints 21 and 22 and a telescopic relay transmission shaft 23. The bevel gear case 19 converts the power into rotation of a vertical shaft, and transmits the rotation to a rotary shaft 17a of the middle rotary blade 12. This rotary shaft 17a and rotary shafts 16a and 18a of the left and right rotary blades 16 and 18 are interlocked by a belt 24 wound thereon. All of the rotary blades 16, 17 and 18 are rotated in the same direction (clockwise as seen from above) and at the same speed, so that the front halves of the tracks of rotation of the rotary blades 16, 17 and 18 point toward the grass discharge opening d.

The mower deck 15 has a recess 150, shaped trapezoidal in plan view, formed in a sideways middle region at the rear end thereof. This recess 150 has a depth (recessing length) to lie forward of the rear universal joint 22, and an opening width Wa larger than the width Wb (FIG. 5) of the pair of right and left rear frames 3b connecting and supporting the rear transmission mechanism. The mower unit M may be raised to such a large extent that the rear universal joint 22 enters the recess 150. Thus, the mower unit M may be raised sufficiently high even if the mower deck 15 has an increased vertical depth and the PTO shaft 12 is disposed in a low location.

The mower deck 15 has obstacle-riding idle rollers (anti-scalp rollers) 25 and 26 arranged in a middle position and adjacent right and left ends at the front end thereof, and obstacle-riding idle rollers 27 arranged in right and left positions adjacent the middle at the rear end. When the mower unit M vertically movable suspended by the link mechanism 4 approaches a slope or a ridge, one or more of the idle rollers 25, 26 and 27 ride(s) the ridge or the like to raise the mower unit M. This prevents the mower deck 15 from directly contacting and scraping the ground. The idle roller 25 in the middle position at the front of the deck 15 and the right and left idle rollers 27 at the rear are fixed against swiveling, while the right and left idle rollers 26 at the front are casters. When the idle rollers 26 engage the ground in time of a sharp turn such as a pivot turn or spin turn of the vehicle body 3, the idle rollers 26 smoothly roll and change directions, following the turning movement of the mower unit M. This avoids scraping of grass by the idle rollers 26 moving extensively.

Figure 9:
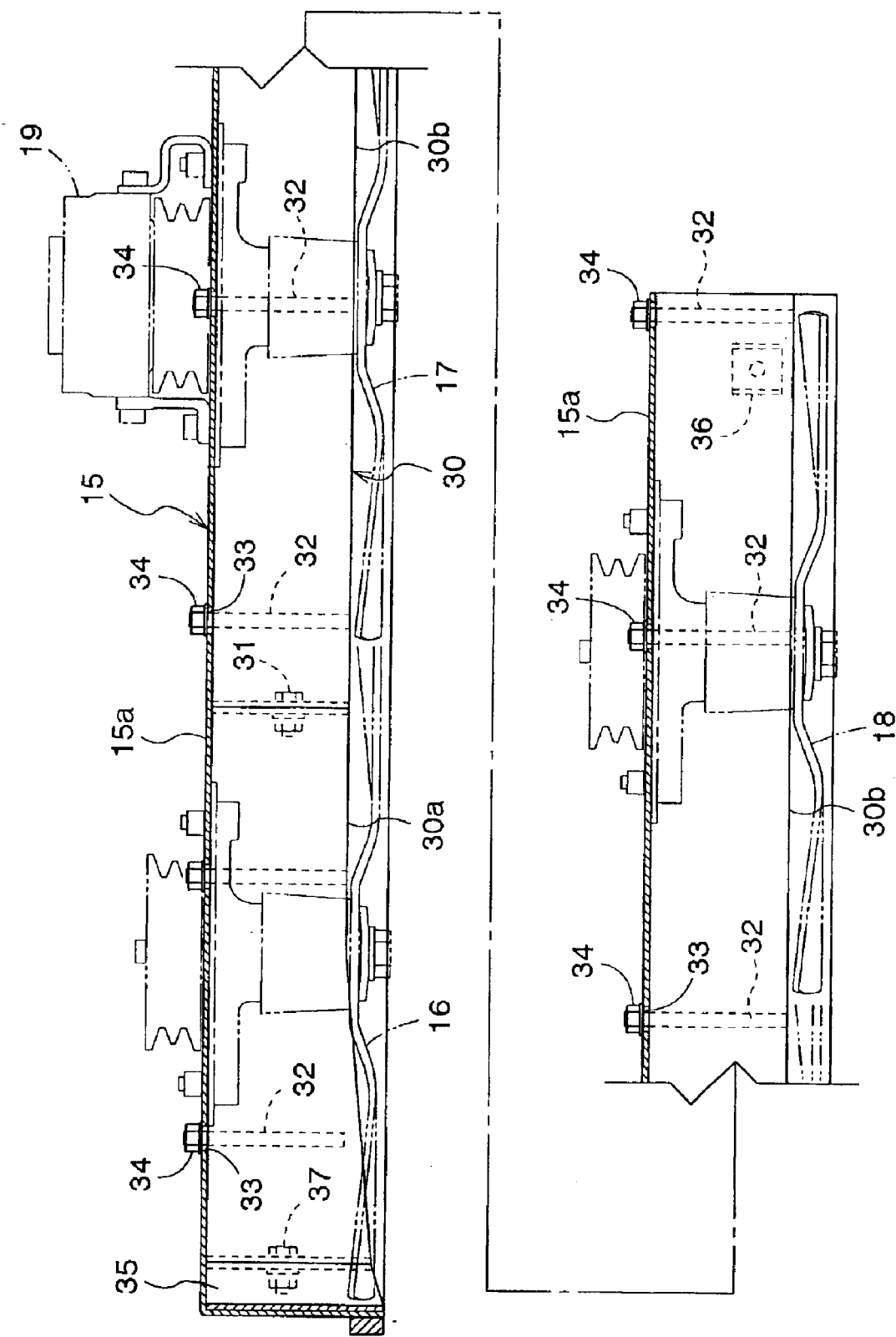
FIG. 9 is a rear view in vertical section of the mower unit in the shredding side discharge mode.
Figure 10:
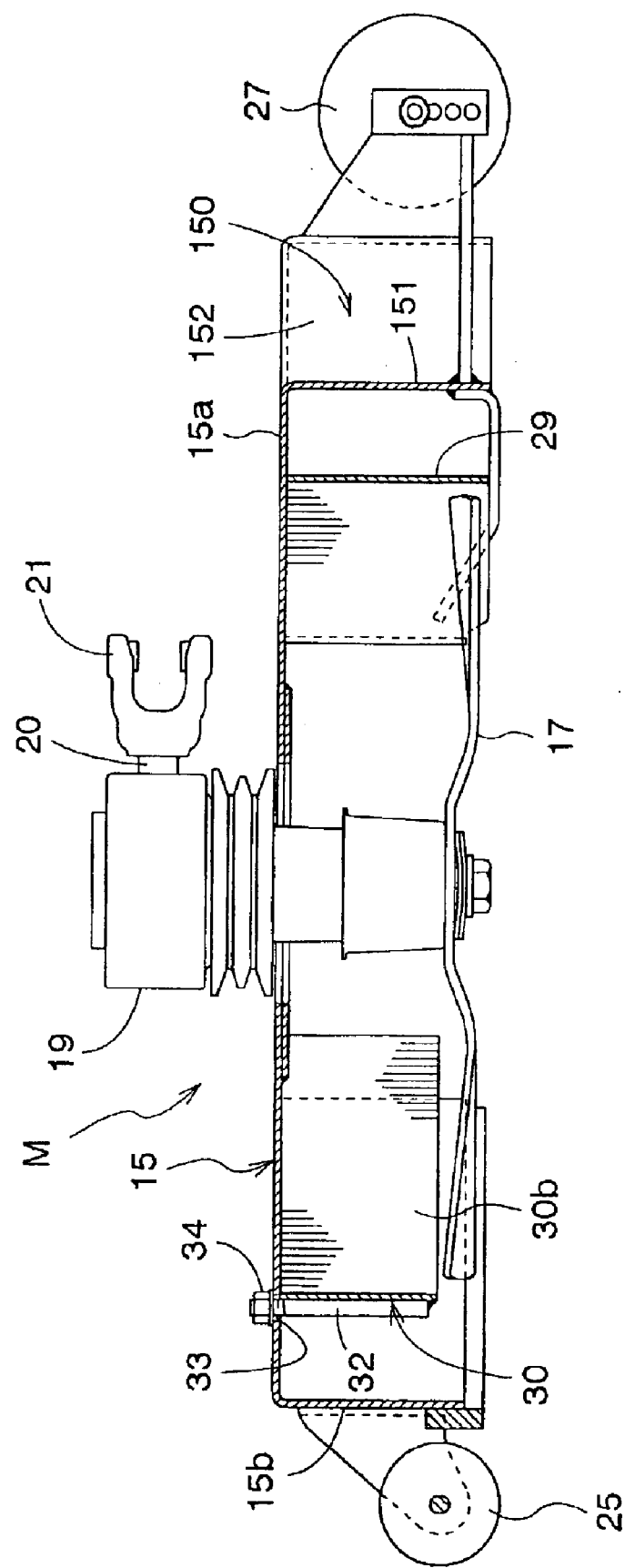
FIG. 10 is a side view in vertical section taken in a sideways middle position of the mower unit in the shredding side discharge mode.

This mower unit M can vary interior specifications of the mower deck 15 to offer the option of three different modes of grass cutting operation. The three modes are a shredding side discharge mode shown in FIGS. 8 through 10, a mulching mode shown in FIGS. 11 through 16, and a standard side discharge mode shown in FIG. 17.

A basic construction of mower deck 15 will be described before describing each operating mode. The mower deck 15 has a flat top board 15a, a front wall 15b depending from the top board 15a, two side walls 15c and 15d, and a rear wall 15e. The front wall 15b, two side walls 15c and 15d and rear wall 15e are substantially continuous except between the front wall 15b and right side wall 15d. These walls may be formed dividable or integral. A grass discharge opening d is formed the front wall 15b and right side wall 15d.

As noted above, the mower deck 15 has the rearwardly opening recess 150 formed in the sideways middle region at the rear end thereof. In order to form the recess 150, the rear wall 15e includes a bottom segment 151 displaced forward and extending sideways, and slant segments 152 for connecting opposite ends of the bottom segment 151 to the left and right side walls 15c and 15d. Thus, the recess 150 has a trapezoidal section in plan view.

Shredding Side Discharge Mode

Figure 8:
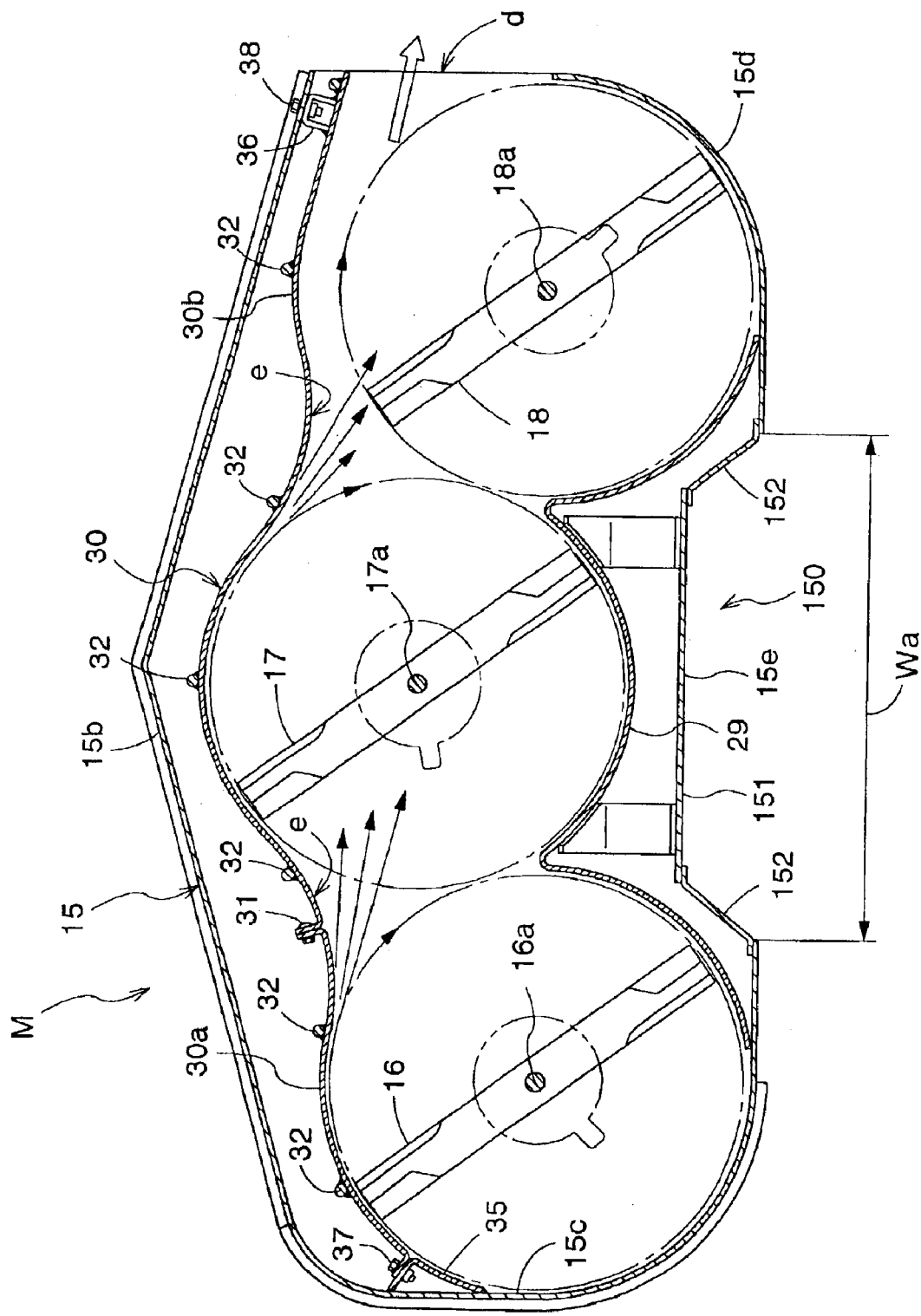
FIG. 8 is a cross-sectional plan view of the mower unit in a shredding side discharge mode.

FIG. 8 shows a cross-sectional plan view of the mower unit M in a shredding side discharge mode suited for cutting upper part of grass under good care, cutting the clippings into relatively small pieces, and discharging and scattering the clippings from the grass discharge opening d. This mower unit M has a rear baffle 29 fixedly welded to a rear position in the mower deck 15 for concentrically surrounding rear parts of the tracks of rotation of the rotary blades 16, 17 and 18, and a front baffle 30 detachably attached to a front position in the mower deck 15 for surrounding front parts of the tracks of rotation of the rotary blades 16, 17 and 18.

This front baffle 30 is in the form of a vertical plate curved into an undulating shape (with an alternation of a forwardly curved segment and a counter curved segment). The front baffle 30 includes a first front baffle 30a opposed to the front part of the rotary blade 16 most upstream (left end) in the grass transport direction and a second front baffle 30b opposed the front parts of the rotary blades 17 and 18 in the middle and most downstream (right end) in the grass transport direction. The first and second front baffles 30a and 30b are in abutment and connected to each other by a bolt 31. The first front baffle 30a and second front baffle 30b have mounting bolts 32 fixedly welded to front surfaces thereof. On the other hand, the top board 15a of the mower deck 15 defines mounting bores 33 for receiving the bolts 32. The bolts 32 of the front baffle 30 are inserted into the bores 33 from inside the deck 15, and nuts 34 are fastened to projecting ends of the bolts 32. The mower deck 15 has a mounting bracket 35 fixedly welded to a left side wall 15b thereof for abutting on the left end of the first front baffle 30a, while the second front baffle 30b has a mounting bracket 36 fixedly welded to a front surface at the right end thereof. The left end of the first front baffle 30a is fastened to the mounting bracket 35 with a bolt 37. The bracket 36 is fastened to the front wall 15b of the mower deck 15 with a bolt 38. Thus, the front baffle 30 is firmly fixed to the inside of the deck 15.

The front baffle 30 with the undulating shape has crest portions (counter curved segments) e protruding inwardly of the deck 15, i.e. the portions opposed to areas between adjacent rotary blades, having a large curvature substantially corresponding to the radius of blade rotation. Part of grass clippings cut by the upstream rotary blades are guided by peripheral surfaces of the forwardly curved segments of the front baffle 30 to be entrained and cut into small pieces by the rotating blades. Part of the grass clippings are guided by smoothly curved surfaces of the counter curved segments e to be distributed to the areas of rotation of the downstream rotary blades to be cut into small pieces.

Mulching Mode

Figure 11:
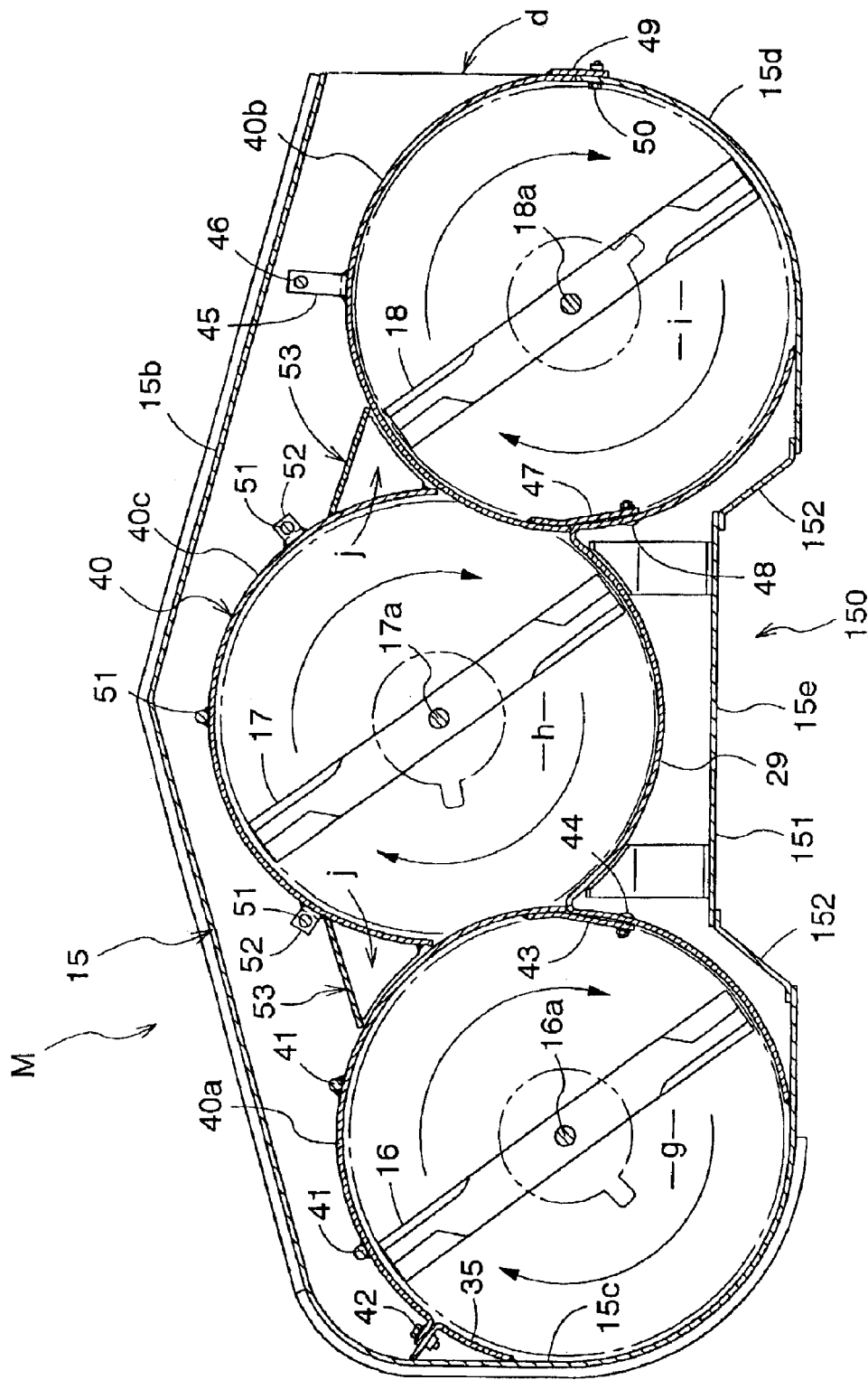
FIG. 11 is a cross-sectional plan view of the mower unit in a mulching mode.

FIG. 11 shows a cross-sectional plan view of the mower unit M in a mulching mode for cutting grass clippings into sufficiently small pieces and leaving them along the track of the mower. In this mode, the foregoing front baffle 30 is replaced by a mulching baffle 40 for forming, in combination with the rear baffle 29, circular mulching chambers g, h and i surrounding the tracks of rotation of the rotary blades 16, 17 and 18, respectively.

Figure 16:
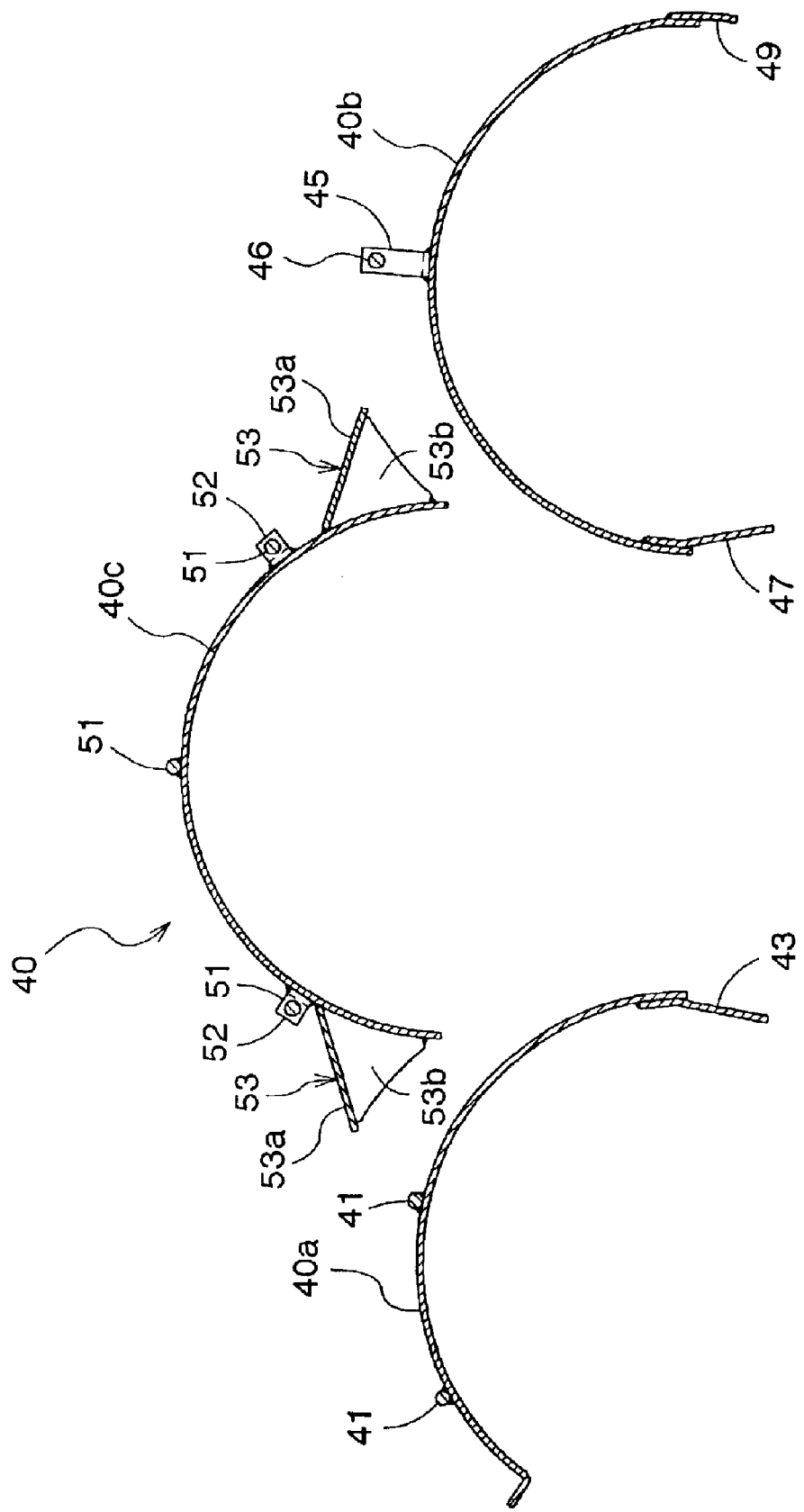
FIG. 16 is an exploded plan view showing components of a mulching baffle.
Figure 17:
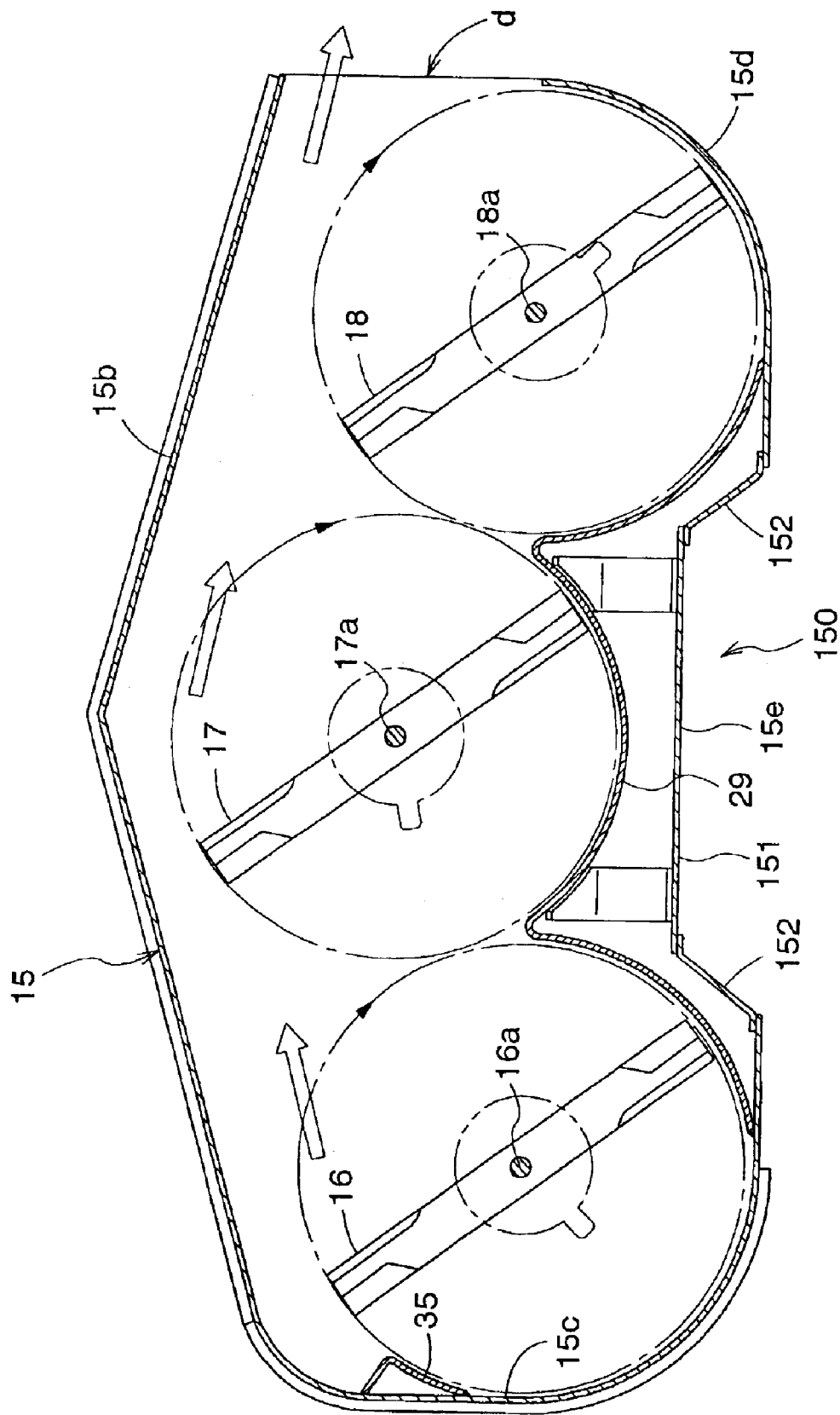
FIG. 17 is a cross-sectional plan view of the mower unit in a standard side discharge mode.

As shown in FIG. 16, the above mulching baffle 40 includes a left mulching baffle 40a, a right mulching baffle 40b, and a middle mulching baffle 40c. These baffles are secured to the deck 15 by using the mounting bores 33.

The left mulching baffle 40a is attached to the mounting bores 33 of the top board 15a by using bolts 41 fixed to the front surface of the baffle 40a. The left end of the left mulching baffle 40a is connected to the bracket 35 on the deck 15 by a bolt 42. The left mulching baffle 40a has a patch 43 fixedly welded to the right end thereof and fastened to the rear baffle 29 by a bolt 44.

The right mulching baffle 40b is attached to one of the mounting bores 33 of the top board 15a by using a bolt 46 fixed to the front surface of the baffle 40b through a support bracket 45. The right mulching baffle 40b has a patch 47 fixedly welded to the left end thereof and fastened to the rear baffle 29 by a bolt 48, and a patch 49 fixedly welded to the right end of the right mulching baffle 40b and fastened to a position rearwardly of the grass discharge opening d by a bolt 50.

Figure 12:
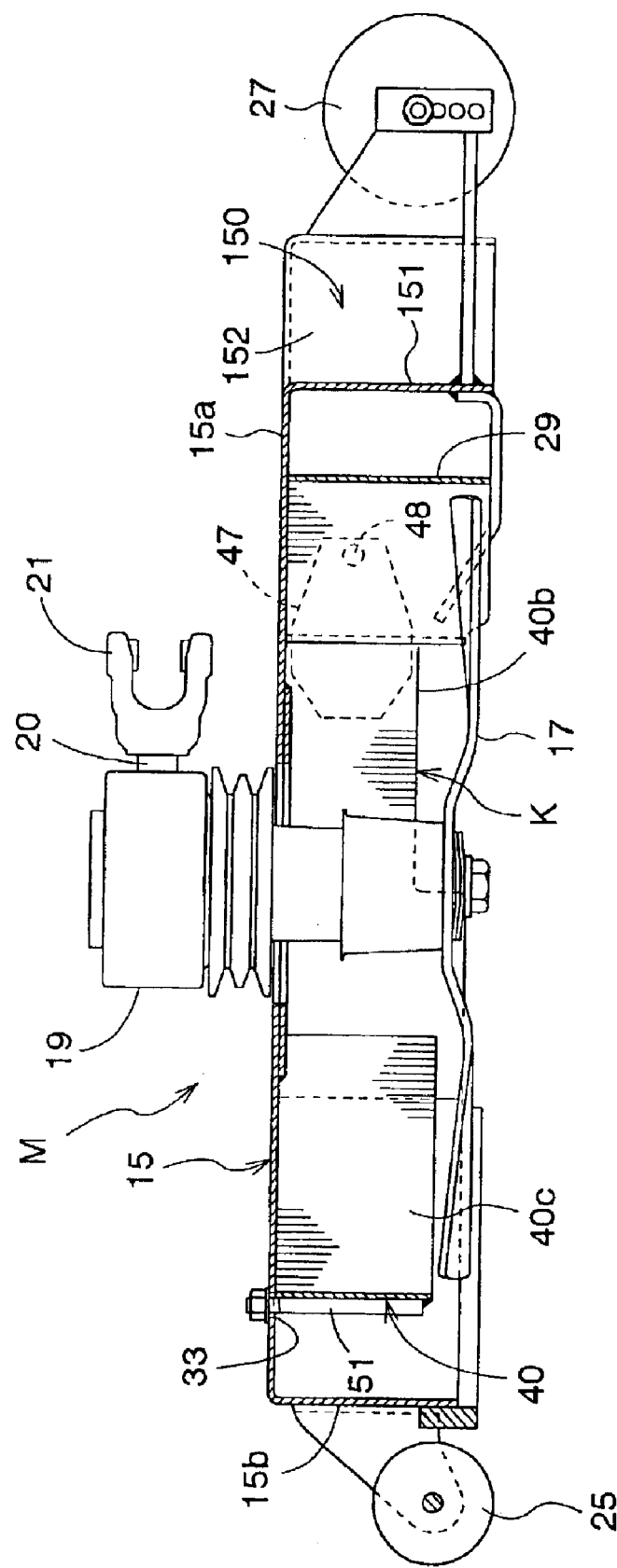
FIG. 12 is a side view in vertical section taken in the sideways middle position of the mower unit in the mulching mode.
Figure 13:
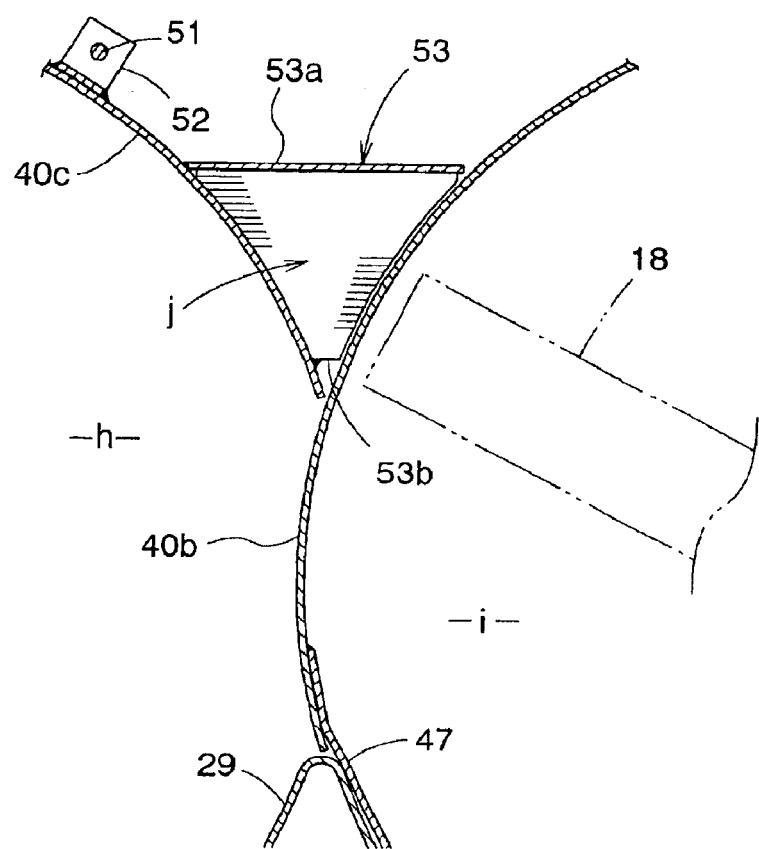
FIG. 13 is a cross-sectional plan view showing part of a mulching baffle.
Figure 14:
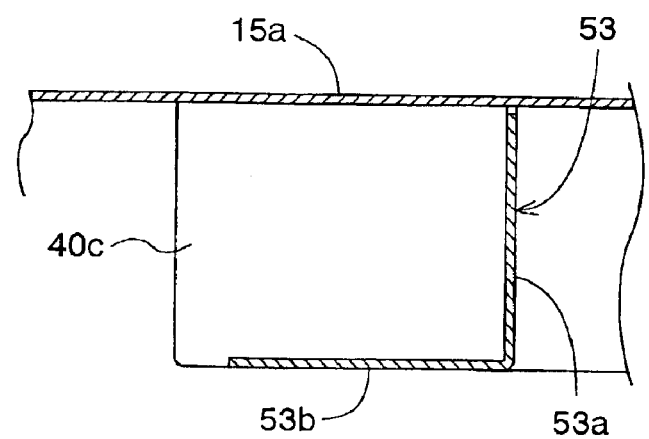
FIG. 14 is a side view in vertical section of a guide member provided for a mulching baffle.

The middle mulching baffle 40c is attached to the mounting bores 33 of the top board 15a by using a bolt 51 directly fixed to the front surface of the baffle 40c and bolts 51 fixed to the front surface through support brackets 52. The middle mulching baffle 40c has guide members 53 fixedly welded to the left and right ends thereof for filling forward-facing V-shaped spaces j formed in junctions between the left and right mulching baffles 40a and 40b and middle mulching baffle 40c. As shown in FIGS. 11 and 12, each guide member 53 is formed of an L-shaped plate defining a front plate portion 53a for closing the front opening of the V-shaped space j, and a bottom plate portion 53b for closing the bottom of the V-shaped space j. The guide members 53 prevent grass having passed by the front wall 15c of the mower deck 15 and having been introduced into the deck 15 from gathering into the V-shaped spaces j. This effectively reduces the chance of leaving the grass unreaped.

In this case, the bottom plate portions 53b perform the function to check the grass standing up and entering the V-shaped spaces j after passing by the front plate portions 53a.

The mulching chambers g and i of the left and right rotary blades 16 and 18 are formed circular and concentric with the tracks of rotation of the blades. The mulching chamber h of the middle rotary blade 17 has a shape partly encroached on by the mulching chambers g and i of the left and right rotary blades 16 and 18. The left and right mulching baffles 40a and 40b have cutouts k formed in lower positions of the portions thereof encroaching on the mulching chamber h of the middle rotary blade 17 in order to avoid interference with the middle rotary blade 17.

Standard Side Discharge Mode

Figure 15:
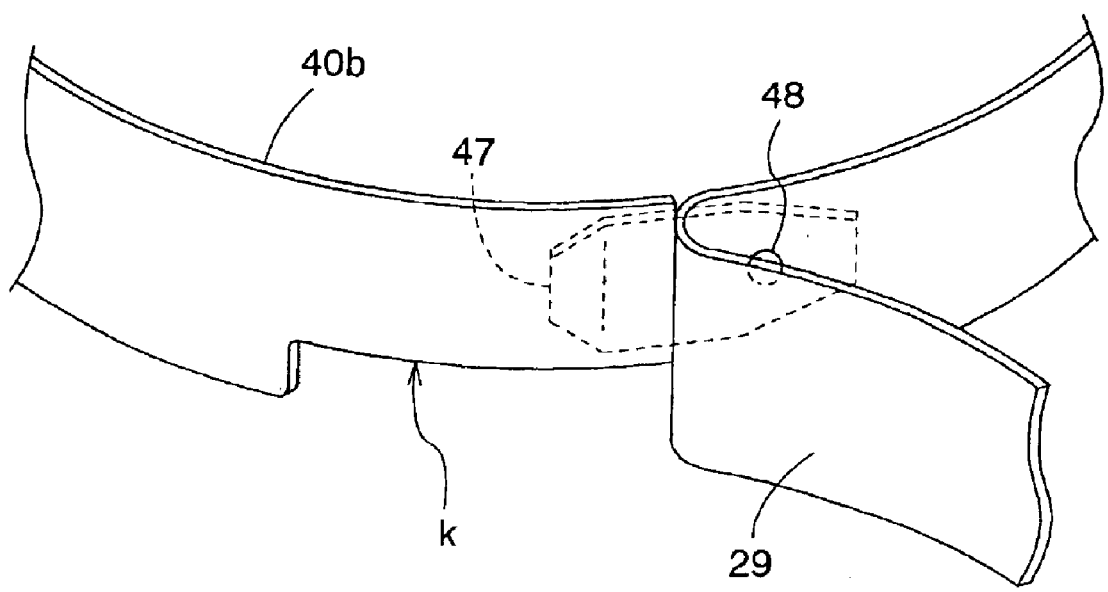
FIG. 15 is a perspective view showing part of a mulching baffle.

FIG. 15 shows a cross-sectional plan view of the mower unit M in a standard side discharge mode for cutting long grass and discharging the clippings from the grass discharge opening d. In this mode, the front baffle 30 and the mulching baffle 40 are removed. The grass clippings cut by the upstream rotary blades are transported quickly along the top board 15a and front wall 15c to the grass discharge opening d of the deck to be discharged therefrom without being guided to the cutting areas of the downstream rotary blades. Thus, long grass may be reaped without causing a useless shredding load.

What is claimed is:

1. A mid-mount mower comprising:
a body frame supported above the ground by front wheels and rear wheels;
a mower unit vertically movably suspended from said body frame between said front wheels and said rear wheels, said mower unit including:
a mower deck having a top board, and a front wall, side walls and a rear wall depending from said top board;
rotary blades juxtaposed inside said mower deck to be rotatable about three vertical axes arranged sideways; and
a mower input shaft disposed on said top board for transmitting power to said rotary blades, said mower input shall extending longitudinally of the mower and having a rear connecting end;
a rear transmission mechanism for driving said rear wheels;
a PTO shaft provided in said rear transmission mechanism, said PTO shaft extending longitudinally of the mower and having a forward connecting end; and
a relay transmission shaft having one end thereof connected to the rear connecting end of said mower input shaft through a front universal joint, and the other end connected to the forward connecting end of said PTO shaft through a rear universal joint;
wherein said mower deck has a recess formed in a sideways middle region at a rear end thereof, said recess opening rearward in a longitudinal direction of the mower in plan view, to receive said rear universal joint when said mower unit is raised.

2. A mid-mount mower as defined in claim 1, wherein said mower deck comprises a flat deck, with an upper surface of said top board having a substantially uniform height above the ground.

3. A mid-mount mower as defined in claim 1, wherein said body frame includes a front frame pair extending substantially horizontally, and a rear frame pair extending rearward and downward from said front frame pair, said rear transmission mechanism being supported by said rear frame pair, said recess having an opening width larger than a width of said rear frame pair.

4. A mid-mount mower as defined in claim 3, wherein said PTO shaft is disposed at a lower level than axles of said rear wheels.

5. A mid-mount mower as defined in claim 3, wherein said mower deck comprises a flat deck, with an upper surface of said top board having a substantially uniform height above the ground.

6. A mid-mount mower comprising:
a front wheel unit;
a rear wheel unit having a rear axle;
a body frame supported above the ground by said front wheel unit and said rear wheel unit;
a mower unit vertically movably suspended from said body frame between said front wheel unit and said rear wheel unit, said mower unit including:
a mower deck having a top board, and a front wall, side walls and a rear wall depending from said top board;
a plurality of rotary blades juxtaposed inside said mower deck to be rotatable about respective vertical axes arranged sideways; and
a mower input shaft disposed on said top board for transmitting power to said rotary blades;
a rear transmission mechanism for driving said rear axle;
a PTO shaft provided in said rear transmission mechanism; and
a relay shaft extending longitudinally of the mower for transmitting the power from said PTO shaft to said mower input shaft, said relay shaft having at a front end thereof a front universal joint connected to said mower input shaft, said relay shaft further having at a rear end thereof a rear universal joint connected to said PTO shaft;
wherein said mower deck has a recess formed in a sideways middle region at a rear end thereof, said recess opening rearward in a longitudinal direction of the mower to avoid an interference between said mower deck and said rear universal joint when said mower unit is raised; and
wherein said PTO shaft and said rear universal joint are disposed at a lower level than said rear axle, said relay shaft being inclined upward to said front universal joint when said mower unit is raised.

7. A mid-mount mower as defined in claim 6, wherein said front universal joint is positioned at a higher level than said rear axle when said mower unit is raised.

8. A mid-mount mower as defined in claim 6, wherein said mower deck comprises a flat deck, with an upper surface of said top board having a substantially uniform height above the ground.

9. A mid-mount mower as defined in claim 6, wherein said body frame includes a front frame pair extending substantially horizontally, and a rear frame pair extending rearward and downward from said front frame pair, said rear transmission mechanism being supported by said rear frame pair, said recess having an opening width larger than a width of said rear frame pair.

10. A mid-mount mower comprising:
   a front wheel unit;
   a rear wheel unit having a rear axle;
   a body frame supported above the ground by said front wheel unit and said rear wheel unit;
   a mower unit vertically movably suspended from said body frame between said front wheel unit and said rear wheel unit, said mower unit including:
      a mower deck having a top board, and a front wall, side walls and a rear wall depending from said top board;
      a plurality of rotary blades juxtaposed inside said mower deck to be rotatable about respective vertical axes arranged sideways; and
      a mower input shaft disposed on said top board for transmitting power to said rotary blades;
   a rear transmission mechanism for driving said rear axle;
   a PTO shaft provided in said rear transmission mechanism; and
   a relay shaft extending longitudinally of the mower for transmitting the power from said PTO shaft to said mower input shaft, said relay shaft having at a front end thereof a front universal joint connected to said mower input shaft, said relay shaft further having at a rear end thereof a rear universal joint connected to said PTO shaft;
   wherein said mower deck comprises a flat deck, with an upper surface of said top board having a substantially uniform height above the ground; and
   wherein said mower deck has a recess formed in a sideways middle region at a rear end thereof, said recess opening rearward in a longitudinal direction of the mower to avoid an interference between said mower deck and said rear universal joint when said mower unit is raised.

11. A mid-mount mower as defined in claim 10, wherein said PTO shaft and said rear universal joint are disposed at a lower level than said rear axle, said relay shaft being inclined upward to said front universal joint when said mower unit is raised.

12. A mid-mount mower as defined in claim 11, wherein said front universal joint is positioned at a higher level than said rear axle when said mower unit is raised.

13. A mid-mount mower as defined in claim 10, wherein said body frame includes a front frame pair extending substantially horizontally, and a rear frame pair extending rearward and downward from said front frame pair, said rear transmission mechanism being supported by said rear frame pair, said recess having an opening width larger than a width of said rear frame pair.

* * * * *

UNITED STATES PATENT AND TRADEMARK OFFICE
CERTIFICATE OF CORRECTION

PATENT NO.     : 6,877,302 B2
DATED          : April 12, 2005
INVENTOR(S)    : Samejima et al.

It is certified that error appears in the above-identified patent and that said Letters Patent is hereby corrected as shown below:

Column 7,
Line 60, "input shall extending" should read -- input shaft extending --.

Signed and Sealed this

Twenty-seventh Day of September, 2005

JON W. DUDAS
*Director of the United States Patent and Trademark Office*